United States Patent
Khaleel

(10) Patent No.: US 10,099,966 B2
(45) Date of Patent: Oct. 16, 2018

(54) LAYERED FERTILIZER COMPOSITION

(71) Applicant: SAUDI BASIC INDUSTRIES CORPORATION, Riyadh (SA)

(72) Inventor: Mohamed Akasha Khaleel, Riyadh (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 197 days.

(21) Appl. No.: 14/900,521

(22) PCT Filed: Jun. 26, 2014

(86) PCT No.: PCT/IB2014/062626
§ 371 (c)(1),
(2) Date: Dec. 21, 2015

(87) PCT Pub. No.: WO2014/207696
PCT Pub. Date: Dec. 31, 2014

(65) Prior Publication Data
US 2016/0152523 A1  Jun. 2, 2016

Related U.S. Application Data

(60) Provisional application No. 61/840,651, filed on Jun. 28, 2013.

(51) Int. Cl.
| | | |
|---|---|---|
| *C05G 3/00* | (2006.01) | |
| *C05F 3/00* | (2006.01) | |
| *C05B 7/00* | (2006.01) | |
| *C05C 1/00* | (2006.01) | |
| *C05C 9/00* | (2006.01) | |
| *C05D 1/00* | (2006.01) | |
| *C05D 9/00* | (2006.01) | |
| *C05D 9/02* | (2006.01) | |
| *C05B 13/06* | (2006.01) | |
| *C05B 1/02* | (2006.01) | |
| *C05B 17/00* | (2006.01) | |
| *C05B 13/00* | (2006.01) | |
| *C05C 1/02* | (2006.01) | |
| *C05C 3/00* | (2006.01) | |
| *C05C 5/02* | (2006.01) | |
| *C05C 5/04* | (2006.01) | |
| *C05D 1/02* | (2006.01) | |

(52) U.S. Cl.
CPC .............. *C05B 17/00* (2013.01); *C05B 7/00* (2013.01); *C05B 13/00* (2013.01); *C05C 1/02* (2013.01); *C05C 3/005* (2013.01); *C05C 5/02* (2013.01); *C05C 5/04* (2013.01); *C05D 1/005* (2013.01); *C05D 1/02* (2013.01); *C05D 9/02* (2013.01); *C05G 3/0041* (2013.01)

(58) Field of Classification Search
None
See application file for complete search history.

(56) References Cited

U.S. PATENT DOCUMENTS

| | | | |
|---|---|---|---|
| 5,849,060 A | 12/1998 | Diping et al. | |
| 7,811,352 B2 | 10/2010 | Binder et al. | |
| 8,236,086 B2 | 8/2012 | Janssen et al. | |
| 8,425,648 B2 * | 4/2013 | Cisneros | C05D 3/02 71/21 |
| 9,296,661 B1 * | 3/2016 | Ankeny | C05G 3/00 |
| 2002/0121117 A1 | 9/2002 | Hartmann et al. | |
| 2004/0016275 A1 * | 1/2004 | Hartmann | C05B 7/00 71/55 |
| 2011/0172092 A1 * | 7/2011 | Lee | C05F 11/00 502/416 |
| 2012/0272700 A1 * | 11/2012 | Nevin | C05C 9/005 71/12 |
| 2013/0143737 A1 * | 6/2013 | Varadachari | C05B 13/06 504/101 |

FOREIGN PATENT DOCUMENTS

| | | |
|---|---|---|
| CN | 1252005 A | 5/2000 |
| CN | 101362662 A | 2/2009 |
| CN | 100484907 C | 5/2009 |
| CN | 101665392 A | 3/2010 |
| CN | 102126890 A | 7/2011 |
| CN | 102584477 A | 7/2012 |
| EP | 416018 A1 | 3/1991 |
| EP | 2509932 A1 | 10/2012 |
| GB | 2116960 A | 10/1983 |
| JP | 51051465 B2 | 5/1976 |
| JP | 52150272 B2 | 12/1977 |
| JP | 7033574 | 2/1995 |
| WO | WO-89/011462 A1 | 11/1989 |
| WO | WO-93/10062 A1 | 5/1993 |
| WO | WO-2011/071909 A1 | 6/2011 |
| ZA | 2001098780 | 11/2001 |

OTHER PUBLICATIONS

Garcia, et al., (1995) "Coated di-ammonium phosphate effect on soil nitrogen lixiviation and its relation with properties kinetics", Communications in soil science and plant analysis, v. 26(19/20) (Abstract).
Xiao, et al., (2010) "Development and evaluation of fertilizers cemented and coated with organic-inorganic materials", available at http://en.cnki.com.cn/Article_en/CJFDTOTALYYSB201001018.htm (Abstract).
Ying, (2006) "Studies on the Preparation and Nutrient Release Characteristics of Chitosan-coated Compound Fertilizer", available at http://www.dissertationtopic.net/doc/1002461 (Abstract).

(Continued)

*Primary Examiner* — Wayne Langel
(74) *Attorney, Agent, or Firm* — Norton Rose Fulbright US LLP

(57) ABSTRACT

A fertilizer composition comprises an inorganic fertilizer particle, a first layer disposed on the inorganic fertilizer particle, and a second layer disposed on the first layer wherein the first layer comprises biomaterial and the second layer comprises phosphoric acid, ammonium polyphosphate, or a combination comprising at least one of the foregoing. A method of making the fertilizer composition is also described herein.

20 Claims, No Drawings

(56) References Cited

OTHER PUBLICATIONS

Zhao, (2003) "Study situation and developing prospect of coated slow/controlled release fertilizers", available at http://en.cnki.com.cn/Article_en/CJFDTOTAL-JKGH200305014.htm (Abstract).
Written Opinion of the International Searching Authority dated Oct. 14, 2014 for international application PCT/IB2014/062626, filed on Jun. 24, 2014 and published as WO 2014/207696 on Dec. 31, 2014 (Applicant—Saudi Basic Industries Corporation // Inventor—Akasha) (6 pages).
International Search Report of the International Searching Authority dated Oct. 14, 2014 for international application PCT/IB2014/062626, filed on Jun. 24, 2014 and published as WO 2014/207696 on Dec. 31, 2014 (Applicant—Saudi Basic Industries Corporation // Inventor—Akasha) (6 pages).

* cited by examiner

LAYERED FERTILIZER COMPOSITION

CROSS-REFERENCE TO RELATED APPLICATIONS

This is a U.S. National Phase Application of International Application No. PCT/IB2014/062626, filed Jun. 26, 2014, which claims the benefit of U.S. Provisional Application No. 61/840,651, filed on Jun. 28, 2013, which are both incorporated herein by reference in their entirety.

BACKGROUND

Granular fertilizers can be coated to reduce dust production and to slow the release of nutrients into the soil over time decreasing the environmental risk. If the fertilizer nutrients are released too quickly plants can be harmed due to the nutrient loss in the soil by leaching to underground and/or through volatilization to atmosphere, degradation (chemical, photochemical and biological), adsorption, or land immobilization. Coating materials typically have limited solubility in water—this limited solubility being essential to the slow release of nutrients over time.

Typical coatings involve polymers, petroleum products, oils, and sulfur containing materials. Each of these coatings suffer from one or more drawbacks such as cost, being environmentally unfriendly, and increasing soil salinity. There remains a need in the art for improved coatings for granular fertilizers.

BRIEF DESCRIPTION

Described herein is a fertilizer composition comprising an inorganic fertilizer particle, a first layer disposed on the inorganic fertilizer particle and a second layer disposed on the first layer wherein the first layer comprises biomaterial and the second layer comprises phosphoric acid, ammonium polyphosphate, or a combination comprising at least one of the foregoing.

Also described herein is a method of making a fertilizer composition comprising coating an inorganic fertilizer particle with biomaterial to form a coated particle having a first layer and coating the coated particle with a phosphate composition to form a coated particle having a first layer and a second layer, wherein the phosphate composition comprises phosphoric acid, ammonium phosphate, or a combination comprising at least one of the foregoing.

The above described and other features are exemplified by the following figures and detailed description.

DETAILED DESCRIPTION

The fertilizer compositions described herein have several unique features and advantages. The first layer comprises biomaterial which forms a natural polymeric material to coat the inorganic fertilizer particle. The biomaterial itself provides nutrients to the soil as well as functioning as a slow release layer for the inorganic fertilizer particle. The second layer comprises phosphoric acid, ammonium polyphosphate, or a combination comprising at least one of the foregoing. When the fertilizer composition is introduced to the soil the phosphoric acid, ammonium polyphosphate, or combination comprising at least one of the foregoing will react with calcium in the soil at high pH ($>7.0$) to form tricalcium phosphate. Tricalcium phosphate has low solubility in water and thus will form a slow release layer on the outside of the fertilizer composition. The tricalcium phosphate has the advantage of being a slow release layer which only introduces environmentally friendly components to the soil. The calcium was part of the soil originally and the phosphate is an important nutrient. The fertilizer composition described herein is an environmentally friendly slow release fertilizer.

The inorganic fertilizer particle may comprise ammonium sulfate, ammonium nitrate, ammonium sulfate-nitrate, calcium nitrate, calcium ammonium nitrate, urea, phosphorous compounds such as ammonium phosphate, mono- and di-ammonium phosphate, polyphosphate compounds, and triple super phosphate, and potassium compounds such as potassium nitrate, potassium chloride and potassium sulfate, often referred to as potash. Combinations of the foregoing may also be employed. Other common fertilizer elements such as iron, zinc, copper, manganese, magnesium or a combination thereof may be included in minor amounts.

The inorganic fertilizer particle may have any shape. In some embodiments the inorganic fertilizer particles are spherical. The inorganic fertilizer particle may have an average particle size of 1.0 to 4.0 millimeters (mm). Within this range the average particle size can be greater than or equal to 1.5, or greater than or equal to 2.0 mm. Also within this range the average particle size can be less than or equal to 3.5, or less than or equal to 3.0 mm. In some embodiments at least 90% by weight of the inorganic fertilizer particles have a particle size of 2.0 to 4.0 mm. Particle size is determined according to "Size Analysis-Sieve Method" IFDC S-107 issued by International Fertilizer Center (IFDC) which the most common and internationally approved method used to determine fertilizer particle size.

The biomaterial is derived from animal waste, with the understanding that "animal waste" as used herein includes not only the typically understood animal excreta but also the bodies of the animals themselves. That is, "animal waste" herein may include dead animal bodies and portions thereof. In accordance with this invention, the biomaterial may be produced from animal excreta, from animal bodies or both. Because animal excreta can be employed without destruction of the host animal and further because the disposal of excreta can cause significant environmental impact, it is preferable to use only animal excreta and other waste materials from the host animals particularly hair and other such fugitive substances. However, animal farming and meat production can result in a number of dead animal bodies (whole or body parts), and this invention can provide a way in which to beneficially dispose of such bodies, converting them to a biomaterial.

The biomaterial may consist of animal excreta, particularly manure, which should be understood as being the combined feces, urine, and added products such as water, wasted feed, hair, and bedding for the animals, which added products are typically very difficult to separate from the urine/feces excreta. The manure may come from any animal source, even human. Pig, chicken, cow, lamb, goat, and horse manure are likely to be the best source for producing the biomaterial because a great number of these animals are often gathered together in one place for animal farming, thus yielding a significant amount of manure in one place for easier collection. Pig manure is of particular interest because pigs tend to produce a large amount of manure, as compared to other animals.

The biomaterial may be produced by a thermochemical (i.e., pyrolysis) reaction or hydro-thermal conversion process whereby a combination of high temperature and pressure in the absence of oxygen produces smaller hydrocarbon molecules from the larger ones typically found in animal waste. This process is described in EP2509932.

The biomaterial is a substance rich in polar organic compounds, including nitrogen, potassium and phosphorous containing compounds, hydrocarbons and inorganic minerals. The biomaterial can be used neat but, in some applications, the first layer (also referred to as the biomaterial layer) may further comprise additives such as polymers, compatibilizing agents, other resins, extenders, modifiers, fillers, and combinations of additives. These additives, when desired for particular end uses, are incorporated into the biomaterial by simple addition and mixing or by in situ addition during the process of applying the biomaterial to the fertilizer.

The biomaterial layer may comprise 75 to 100 weight percent (wt. %) biomaterial and 0.0 to 25 wt. % additives. Alternatively, the biomaterial layer may comprise 60 to 100 wt. % biomaterial and 40 to 0 wt. % additives. Wt. % is based on the total weight of the biomaterial and additives (i.e., the total weight of the biomaterial coating).

The biomaterial layer covers 90.0 to 100% of the surface area of the inorganic fertilizer particle. Within this range the biomaterial layer may cover greater than or equal to 99.0%, or, greater than or equal to 99.9% of the surface area of the inorganic fertilizer particle.

The biomaterial layer may have a thickness of 20 to 70 micrometers. Within this range the thickness may be greater than or equal to 25, or greater than or equal to 30 micrometers. Also within this range the thickness may be less than or equal to 65, or less than or equal to 60 micrometers.

A second layer is disposed on the biomaterial layer. The second layer comprises phosphoric acid, ammonium polyphosphate, or a combination comprising at least one of the foregoing. The second layer may cover 90 to 100% of the surface area of the particle having a biomaterial coating. Within this range the second layer may cover greater than or equal to 95% or greater than or equal to 99% of the surface area of the particle having a biomaterial layer. The surface area of the particle having a biomaterial layer is defined as the combined surface area of the biomaterial layer and any surface area of the inorganic fertilizer particle that does not have biomaterial coating.

The second layer (also know as the phosphate layer) has a thickness of 20 to 70 micrometers. Within this range the thickness can be greater than or equal to 25, or greater than or equal to 30 micrometers. Also within this range the thickness can be less than or equal to 60, or less than or equal to 55 micrometers. Increasing thickness of the second layer increases the amount of time for release of the biomaterial and inorganic fertilizer.

The biomaterial coating composition may be applied to the inorganic fertilizer particle in any method that is appropriate for the biomaterial coating composition and inorganic fertilizer particle. For instance, the biomaterial coating composition can be sprayed over the particles or mixed with the particles. In one embodiment the biomaterial coating composition is tumbled with the particles in a roller mill. Alternatively, the coated particles may be produced by pan, rotary drum, and fluidized-bed coating techniques.

The biomaterial coating composition is typically a liquid or slurry with a solids content of 35 to 85%. Within this range the solids content can be greater than or equal to 40%, or greater than or equal to 45%. Also within this range the solids content can be less than or equal to 80%, or less than or equal to 75%. The liquid or slurry can be made using a diluent such as water or an aliphatic alcohol having one to four carbons.

After applying the biomaterial coating composition the coated particle is dried at a temperature of 60 to 80° C. for 15 to 35 minutes to form a particle having a first layer (also referred to as a particle having a biomaterial layer). In some embodiments the moisture content of the particle having a biomaterial layer is less than 2.5% by weight.

A phosphate coating composition is applied to the particle having a biomaterial layer. The phosphate coating composition may be applied to the particle having a biomaterial layer in any method that is appropriate for the phosphate coating composition and the particle having first layer. For instance, the phosphate coating composition can be sprayed over the particles or mixed with the particles. In one embodiment the phosphate coating composition is tumbled with the particles in a roller mill.

The phosphate coating composition is typically a liquid or slurry with a solids content up to 30.0%. Within this range the solids content can greater than or equal to 1.0%. Also within this range the solids content can be less than or equal to 25.0%, or less than or equal to 20.0% The liquid or slurry can be made using a diluent such as water or an aliphatic alcohol having one to four carbons. The phosphate coating composition can have a concentration of 1.40-1.68 grams per milliliter (g/ml).

After applying the phosphate coating composition the coated particle is dried at a temperature of 65 to 85° C. for 20 to 45 minutes to form a particle having a first layer and a second layer. The final moisture content of the particle having a first layer and a second layer may be <1.0%. The coated particle having two layers is applied to the soil. The second layer comprising phosphate reacts with calcium in the soil to form tricalcium phosphate. Tricalcium phosphate is known to have little solubility in water and thus forms an ideal controlled release layer—extending the time required for the fertilizer to be released into the soil.

EXAMPLES

Ammonium polyphosphate was obtained by condensing phosphoric acid by heating to form polyphosphoric acid. The polyphosphoric acid was treated with anhydrous ammonia under moderate pressure. A thick liquid was produced which comprised ammonium polyphosphate.

Ammonium polyphosphate and phosphoric acid were used to make fertilizer compositions. Three types of inorganic fertilizer particles were used—a urea fertilizer particle (46:0:0), an NPK fertilizer particle (11:29:19), and an NPK fertilizer particle (14:38:10). The particles were approximately 2.0 to 4.0 millimeters in size. The particles were passed through hot air to dry them before entering the coating chamber. The coating chamber had circulating air to keep the particles in motion during the coating process. The biomaterial (animal and human manure) was received as a dry, heat treated (to destroy potential pathogens) material. The dry material was mixed with water to form a biomaterial coating composition. The biomaterial coating composition was pumped through a nozzle and sprayed into the coating chamber onto the fertilizer particles. The particles with the biomaterial coating were then dried at 85-95° C. and then cooled prior to the next coating step. The second layer comprising phosphoric acid, ammonium polyphosphate, or a combination comprising at least one of the foregoing was applied in a similar fashion as the biomaterial.

The coated particles were tested for fertilizer release. Five grams of fertilizer (coated and uncoated as shown in Table 1) were incorporated with 50 grams of calcareous soil (25 wt. % $CaCO_3$) and placed in a transparent plastic tube with open ends. A thin layer of cotton or wool was placed at the bottom of each tube to prevent the contents from escaping and to allow water and any dissolved nutrients to pass through the collection container. The samples were irrigated with water. The irrigation water was free of nitrogen, phosphorous, and potassium. Water was applied when the soil in the tubes dried out (simulating real life irrigation processes). The collected irrigation water was tested for nitrogen, phosphorous, and potassium. Total nitrogen was determined by using a combustion analyzer. The combustion analyzer was purged (purge phase) and then the burn phase was initiated. In this phase the sample was dropped into a hot furnace (850° C.) and flushed with pure oxygen for very rapid combustion. After the burn phase the analysis phase occurred in which the combustion gases in the ballast were allowed to become homogeneous by passive mixing and a 3 cubic centimeter aliquot was captured in a loop and swept through hot copper to remove oxygen and convert all $NO_x$ to $N_2$ form and then pass into suitable filters to remove $CO_2$ and water. The resulting nitrogen was measured by a thermal conductivity cell. The final result was displayed as weight percentage of nitrogen.

Phosphorus content was determined by spectrophotometric technique. Color was developed with vanadium molybodate complex agent. Color intensity was proportional to $P_2O_5$ concentration. Phosphorus content was measured after calibration of the spectrophotometer with known $P_2O_5$ standards.

For potassium measurement the sample was analyzed by Inductively Coupled Plasma Atomic Emission Spectroscopy (ICP-AES).

Results are shown in Table 1. All coated materials had a biomaterial coating. The phosphoric acid coating is indicated in the Table as PA. The ammonium polyphosphate coating is indicated as APP.

TABLE 1

|  | Uncoated urea | Uncoated NPK (11:29:19) | Uncoated NPK (10:34:10) | Urea with PA coating | Urea with APP coating | NPK (11:29:19) with PA coating | NPK (11:29:19) with APP coating | NPK (14:38:10) with PA coating | NPK (14:38:10) with APP coating |
|---|---|---|---|---|---|---|---|---|---|
| N % after one week | 4.34 | 2.40 | 2.33 | 2.40 | 2.71 | 1.7 | 1.44 | 1.54 | 1.50 |
| N % after one month | 0.01 | 1.90 | 1.90 | 2.01 | 1.92 | 1.0 | 1.10 | 1.00 | 0.92 |
| N % after 3 months | 0.0 | 0.02 | 0.02 | 1.65 | 1.70 | 1.19 | 1.10 | 1.10 | 1.0 |
| P % after one week | — | 4.30 | 4.50 | — | — | 1.19 | 3.20 | 1.52 | 3.55 |
| P % after one month | — | 0.40 | 0.30 | — | — | 0.16 | 0.20 | 0.39 | 0.51 |
| P % after 3 months | — | 0.02 | 0.04 | — | — | 0.16 | 0.14 | 0.22 | 0.19 |
| K % after one week | — | 7.05 | 6.40 | — | — | 3.15 | 4.02 | 3.2 | 3.5 |
| K % after one month | — | 3.50 | 2.45 | — | — | 3.00 | 2.98 | 2.65 | 2.35 |
| K % after 3 months | — | <0.1 | <0.1 | — | — | 2.55 | 2.55 | 2.38 | 2.22 |

The data in Table 1 shows that the uncoated inorganic fertilizer particles release substantively all of the nitrogen, phosphorous and potassium by 3 months. In contrast, the coated fertilizer particles show a more extended release of the nitrogen, phosphorous and potassium.

Embodiment 1

A fertilizer composition comprising an inorganic fertilizer particle, a first layer disposed on the inorganic fertilizer particle and a second layer disposed on the first layer wherein the first layer comprises biomaterial and the second layer comprises phosphoric acid, ammonium polyphosphate, or a combination comprising at least one of the foregoing.

Embodiment 2

The fertilizer composition of Embodiment 1, wherein the inorganic fertilizer particle comprises ammonium sulfate, ammonium nitrate, ammonium sulfate-nitrate, calcium nitrate, calcium ammonium nitrate, urea, ammonium phosphate, mono- and di-ammonium phosphate, polyphosphate, triple super phosphate, potassium nitrate, potassium chloride and potassium sulfate, or a combinations of the foregoing.

Embodiment 3

The fertilizer composition of Embodiment 2, wherein the inorganic fertilizer particle further comprises iron, zinc, copper, manganese, magnesium or a combination thereof.

Embodiment 4

The fertilizer composition of any of Embodiments 1 to 3, wherein the inorganic fertilizer particle has an average particle size of 1.0 to 4.0 millimeters (mm).

Embodiment 5

The fertilizer composition of any of Embodiments 1 to 4, wherein at least 90% by weight of the inorganic fertilizer particles have a particle size of 2.0 to 4.0 mm.

Embodiment 6

The fertilizer composition of any of Embodiments 1 to 5, wherein the biomaterial is derived from animal waste.

Embodiment 7

The fertilizer composition of any of Embodiments 1 to 6, wherein the biomaterial consists of animal and human excreta.

Embodiment 8

The fertilizer composition of any of Embodiments 1 to 7, wherein the first layer comprises 75 to 100 weight percent (wt. %) biomaterial and 0.0 to 25 wt. % additives.

Embodiment 9

The fertilizer composition of any of Embodiments 1 to 8, wherein the first layer covers 90.0 to 100% of the surface area of the inorganic fertilizer particle.

Embodiment 10

The fertilizer composition of any of Embodiments 1 to 9, wherein the first layer has a thickness of 20 to 70 micrometers.

Embodiment 11

The fertilizer composition of any of Embodiments 1 to 10, wherein the second layer covers 90 to 100% of the surface area of the particle having a first layer.

Embodiment 12

The fertilizer composition of any of Embodiments 1 to 11, wherein the second layer has a thickness of 20 to 70 micrometers.

Embodiment 13

The fertilizer composition of any one of Embodiments 1 to 12, wherein the composition has moisture content of less than 1.0%.

Embodiment 14

A method of making a fertilizer composition comprising coating an inorganic fertilizer particle with biomaterial coating composition to form a coated particle having a first layer and coating the coated particle having a first layer with a phosphate coating composition to form a coated particle having a first layer and a second layer, wherein the phosphate coating composition comprises phosphoric acid, ammonium phosphate, or a combination thereof.

Embodiment 15

The method of Embodiment 14, wherein the biomaterial coating composition has a solids content of 35 to 85%.

Embodiment 16

The method of Embodiment 14 or 15, wherein the coated particle having a first layer has a moisture content of less than 2.5% by weight.

Embodiment 17

The method of any of Embodiments 14 to 16, wherein the phosphate coating composition has a concentration of 1.40-1.68 grams per milliliter.

Embodiment 18

The method of any of Embodiments 14 to 17, wherein the coated particle having a first layer and a second layer has a moisture content less than 1.0%.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A fertilizer composition comprising an inorganic fertilizer particle, a first layer disposed on the inorganic fertilizer particle and a calcium reactive second layer disposed on the first layer wherein the first layer comprises biomaterial and the second layer comprises one or more of phosphoric acid, ammonium polyphosphate, ammonium phosphate, or a combination thereof in an amount sufficient to react with calcium in a soil.

2. The fertilizer composition of claim 1, wherein the inorganic fertilizer particle comprises ammonium sulfate, ammonium nitrate, ammonium sulfate-nitrate, calcium nitrate, calcium ammonium nitrate, urea, ammonium phosphate, mono- and di-ammonium phosphate, polyphosphate, triple super phosphate, potassium nitrate, potassium chloride and potassium sulfate, or a combination thereof.

3. The fertilizer composition of claim 2, wherein the inorganic fertilizer particle further comprises iron, zinc, copper, manganese, magnesium or a combination thereof.

4. The fertilizer composition of claim 1 wherein the inorganic fertilizer particle has an average particle size of 1.0 to 4.0 millimeters (mm).

5. The fertilizer composition of claim 1, wherein the fertilizer composition comprises a plurality inorganic fertilizer particles, wherein at least 90% by weight of the plurality of inorganic fertilizer particles have a particle size of 2.0 to 4.0 mm.

6. The fertilizer composition of claim 1, wherein the biomaterial is derived from animal waste.

7. The fertilizer composition of claim 1 wherein the biomaterial comprises animal excreta.

8. The fertilizer composition of claim 1, wherein the first layer further comprises one or more additives selected from the group consisting of a polymer, a compatibilizing agent, a resin, an extender, a modifier, a filler, and combinations thereof.

9. The fertilizer composition of claim 1, wherein the first layer covers 90 to 100% of the surface area of the inorganic fertilizer particle.

10. The fertilizer composition of claim 1, wherein the first layer has a thickness of 20 to 70 micrometers.

11. The fertilizer composition of claim 1, wherein the second layer covers 90 to 100% of the surface area of the particle having a first layer.

12. The fertilizer composition of claim 1, wherein the second layer has a thickness of 20 to 70 micrometers.

13. The fertilizer composition of claim 1, wherein the fertilizer composition has moisture content of less than 1.0%.

14. The fertilizer composition of claim 7, wherein the excreta is manure.

15. The fertilizer composition of claim 8, wherein the first layer comprises up to 25 wt. % of the one or more additives.

16. A method of making a fertilizer composition comprising coating an inorganic fertilizer particle with biomaterial coating composition to form a coated particle having a first layer and coating the coated particle having a first layer with a phosphate coating composition to form a coated particle having a first layer and a calcium reactive second layer, wherein the phosphate coating composition comprises one or more of phosphoric acid, ammonium phosphate, ammonium polyphosphate, or a combination thereof, and wherein the calcium reactive second layer comprises one or more of phosphoric acid, ammonium polyphosphate, ammonium phosphate, or a combination thereof in an amount sufficient to react with calcium in a soil.

17. The method of claim 16, wherein the biomaterial coating composition has a solids content of 35 to 85%.

18. The method of claim 16 wherein the coated particle having a first layer has a moisture content of less than 2.5% by weight.

19. The method of claim 16, wherein the phosphate coating composition has a concentration of 1.40-1.68 grams per milliliter of phosphoric acid, ammonium phosphate, ammonium polyphosphate, or a combination thereof.

20. The method of claim 16, wherein the coated particle having a first layer and a second layer has a moisture content less than 1.0%.

* * * * *